(No Model.)
W. I. PAGE.
METALLIC PACKING.
No. 432,327. Patented July 15, 1890.
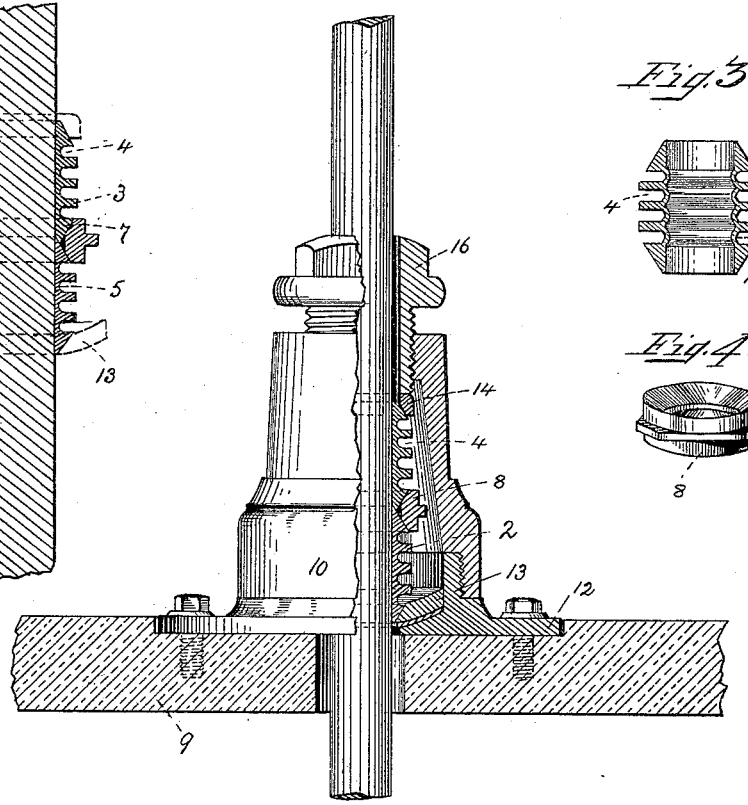
Witnesses:
Francis C. Stanwood
John A. Dougherty
Inventor:
Wm I. Page.
by H. E. Lodge Atty.

UNITED STATES PATENT OFFICE.

WILLIAM I. PAGE, OF BOSTON, MASSACHUSETTS, ASSIGNOR OF FORTY-NINE ONE-HUNDREDTHS TO FRED. M. WHITE, OF SAME PLACE.

METALLIC PACKING.

SPECIFICATION forming part of Letters Patent No. 432,327, dated July 15, 1890.

Application filed April 7, 1890. Serial No. 346,824. (No model.)

*To all whom it may concern:*

Be it known that I, WILLIAM I. PAGE, a citizen of the United States, residing at Boston, in the county of Suffolk and State of Massachusetts, have invented certain new and useful Improvements in Metallic Packing; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in metallic packing to be used on valve-stems, piston-rods, or in similar locations where a steam, water, or gas tight joint is required.

The object of my invention is to produce a solid packing which is to be capable of taking up wear and enabling the joint to be kept tight simply by advancing the adjusting-gland.

My invention, in brief, consists of a single piece of babbitt or other suitable metal cast or otherwise formed, as follows: A short cylinder is bored lengthwise or cast with a diameter to fit the rod or valve-stem, while upon its exterior surface is cut or otherwise produced a series of annular grooves which extend some distance into the body of the metal, thereby reducing or crippling the metal at that point. When this integral ring is subjected to pressure, the metal at the bottom of the grooves or at the weakest portion yields and is thrust inwardly upon the rod. Thus the enlargement of the bore of the packing consequent upon wear is compensated for and fresh metal is supplied. In this way a solid packing-ring can be made which has all the advantages of packings possessing elastic or yielding characteristics after the manner of fibrous packing in general use.

The drawings represent, in Figure 1, a sectional elevation of a metallic packing embodying my invention. Fig. 2 is a sectional view showing the packing adapted for multiplication. Fig. 3 is a longitudinal section of a packing-piece after compression. Fig. 4 is a perspective view of the compression-ring.

The object of my invention is to produce a solid ring-packing which shall be capable of compression about the rod or shaft upon which it is applied in order to compensate for the wear, or in case it should become necessary to render the joint tight against increased pressure or for other incidental causes.

This packing 2 is composed of some soft metal or alloy, such as is used for bearings, and commonly termed "babbitt." Its construction is as follows: In general shape it is a hollow cylinder, the internal diameter being such as to fit the rod or valve-stem about which it is to be applied. The exterior surface of this packing is formed with alternate annular ribs 3 and grooves 4. The cross-section of the latter are U-shaped, preferably oval or circular at the bottom, and cut of such a depth as to leave a thin web 5 of metal, which interconnects the two adjacent ribs or rings 3. The purpose of such construction is to present the weakest portion of the web 5 centrally between the ribs; hence when pressure is brought upon the packing 2 said rings are forced together, and the metal forming the web is thrust against the rod or valve-stem. In this way a fresh packing-surface is presented, which compensates for wear and maintains the joint tight.

These packing-pieces 2 are adapted for multiplication upon a rod, in which event their ends are tapered or of conical shape, while the contiguous ends are termed, respectively, "male" and "female." This construction is shown in Fig. 2, where the male end 6 is shown as fitting tightly to the rod, while the female 7 is slightly flared at this point and adapted to receive the male end, the latter crowding between it and the rod. In connection therewith I employ a compression-ring 8 of some hard metal, which is reversely tapered interiorly to coincide with the tapered ends of the packing-pieces 2. At the meeting of the said tapers a flat surface is created which is adapted to prevent the metal of the packing from spreading outwardly when pressure is exerted against the opposite ends of the said packing-pieces. Thus when the gland forces said pieces together the metal composing them and located beneath the compression-ring is only thrust the more forcibly against the rod.

By such arrangement the required packing-surface may be made of any extent and continuous along the rod.

Having thus created several of the packing-pieces 2, I proceed as follows: To the end of a steam-chest or cylinder-head 9 (shown in part, Fig. 1) I secure a packing-case 10, separably united with a flanged base 12, rigidly bolted to said steam-chest. The interior central portion of said base is dished or concave and adapted to receive a bearing-plate 13, which is coincident in curvature with the concave portion of the base. The bore both of the base and that of the bearing-plate are of larger diameter than the rod, which thus passes freely through. That portion of the bearing-plate contiguous to the packing 2 is preferably cut away or flared to receive the tapered end of such packing, pressure from the gland at the opposite end serving to crowd the soft-metal packing snugly about the rod. A packing-piece 2 is now passed over the rod 15, a compression-ring follows, and then a second packing-piece. Finally the follower 14 is added, and the gland 16 is then positioned, engaging with the outer end of the casing 10. The gland is now screwed down until the desired pressure upon the rod is obtained.

It is to be observed that the follower 14 is adapted to receive the tapered end of the packing contiguous thereto after the manner of the bearing-plate, while the bores of both follower and gland exceed the diameter of the rod to permit of lateral divergence of the reciprocating rod, should such occur.

What I claim is—

1. A metallic packing-ring provided with outwardly-tapering ends and an intermediate cylindrical part, grooves and ribs being formed alternately therein, substantially as set forth.

2. The combination of a packing-case, an adjustable gland, and a reciprocating rod with a metallic packing having its ends tapered outward and an intervening cylindrical portion in which alternating grooves and ribs are formed, substantially as set forth.

3. The combination, with a packing-case 10, its adjustable gland 14, the bearing-plate 12, and a follower 13, of two or more packing-rings 2, provided with alternate annular ribs and grooves, the contiguous ends being tapered and adapted to engage, as set forth, and a compression-ring 8, of some hard metal, clasping the joint produced by the contact of said ends, substantially as stated.

4. Two or more packing-pieces, each composed of a hollow continuous cylinder of some soft metal and exteriorly formed with alternate annular ribs and grooves, combined with a compression-ring of some hard metal overlapping the contiguous ends of said pieces and covering the joint at this point, substantially as described.

In testimony whereof I affix my signature in presence of two witnesses.

WILLIAM I. PAGE.

Witnesses:
H. E. LODGE,
FRANCIS C. STANWOOD.